Patented June 16, 1931

1,810,277

UNITED STATES PATENT OFFICE

GEORG KALISCHER, OF FRANKFORT-ON-THE-MAIN, AND RICHARD FLEISCHHAUER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW AZO DYESTUFFS AND PROCESS OF MAKING SAME

No Drawing. Application filed August 22, 1929, Serial No. 387,802, and in Germany August 28, 1928.

Our present invention relates to new azodyestuffs and to a process of preparing the same.

We have found that new very valuable azodyestuffs are obtained by diazotizing 4-amino-diaryl-cyclohexane-4'-oxamic acids, obtainable, for instance, according to the process disclosed in our copending application Ser. No. 387,798, filed August 22, 1929, and combining the diazo-compounds with azo-components. These dyestuffs yield on saponification new valuable dyestuffs which may be again diazotized and combined with azo-components.

Our new dyestuffs correspond to the general formula:

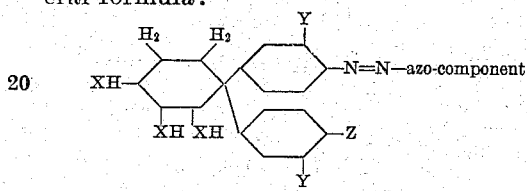

wherein one X means hydrogen or methyl, the other X's hydrogen, the Y's mean hydrogen, halogen, methyl or alkoxy groups, Z means $NH_2$, $NHCOCOOH$ or [N=N—azo-component] and the azo-components may contain further azo-groups.

They are distinguished by clear shades and excellent properties of fastness especially to milling and light. They are mainly suitable for dyeing animal fibers, but according to the azo-components applied they may partially be used also for dyeing cotton or viscose silk. When azo-components containing chromable groups are applied, valuable chromable dyestuffs of an excellent fastness are produced.

In order to further illustrate our invention the following examples are given, the parts being by weight and all temperatures in centigrade degrees. But we wish to be understood that we are not limited to the particular conditions nor to the specific products mentioned therein.

Example 1

33.5 parts of 4-amino-3.3'-dichloro-diphenyl-1.1'-cyclohexane-4'-oxamic acid are dissolved in 100 parts of warm water with the addition of the sufficient amount of ammonia. To this solution a concentrated aqueous solution of 6.9 parts of sodium nitrite and then 52 parts of hydrochloric acid (specific gravity=1.16) are added while cooling. The diazo-compound precipitates partially. In order to finish the reaction the mass is stirred for a short time. Then it is allowed to run slowly into a solution containing 26 parts of the sodium salt of 2-hydroxy-naphthalene-6-sulfonic acid and an excess of soda. The formation of the dyestuff is finished after a short time. The new dyestuff is isolated by the addition of common salt, then filtered and dried. It corresponds to the formula:

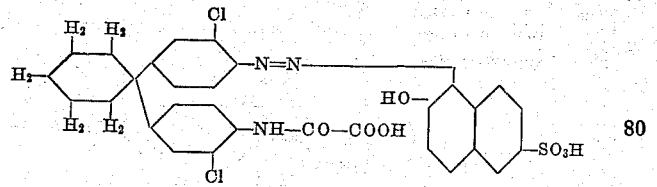

It represents an orange powder, easily soluble in water, dyeing wool from an acid bath clear orange shades of an excellent fastness to milling.

A similar dyestuff is obtained by starting from 4-amino-3.3'-dibromo-1.1'-diphenylcyclohexane-4'-oxamic acid.

Example 2

39.8 parts of 4-amino-3.3'-dimethoxy-diphenyl-1.1' cyclohexane-4'-oxamic acid are diazotized as described in Example 1 and the diazo-compound is introduced into a solution of soda and 42.5 parts of 1-benzoyl-amino-8-hydroxy-naphthalene-4.6-disulfonic acid. When after a short time the formation of the dyestuff is finished, the dyestuff is isolated as described in the foregoing example. It corresponds to the formula:

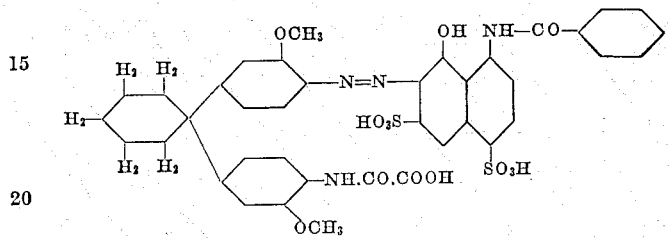

It represents when dry a violetish brown powder easily soluble in water, dyeing wool fast clear reddish violet shades.

Dyestuffs of likewise clear, somewhat more yellowish shades are obtained by replacing the diazo-compound by that of 4-amino-3.3'-dimethyl-diphenyl-cyclohexane-4'-oxamic acid or of 4-amino-3.3'-dimethyl-diphenyl-4''-methyl-cyclohexane-4'-oxamic acid.

These diazo-compounds yield when combined with 1-benzoylamino-8-hydroxynaphthalene-3.6-disulfonic acid or 1-toluene-sulfamino-8-hydroxy-naphthalene-3.6-disulfonic acid or other acylamino-naphthol-sulfonic acids, new azodyestuffs which dye wool bright red to violet shades of the same good fastness.

Dyestuffs of the same properties are obtained by starting from 4-amino-3.3'-diethoxy-diphenyl-cyclohexane-4'-oxamic instead of the corresponding dimethoxy compound mentioned above.

Example 3

36.6 parts of 4-amino-3.3'-dimethyl-diphenyl-cyclohexane-4'-oxamic acid are diazotized as described in Example 1 and the diazo-compound is combined with a solution containing soda and the sodium salt of 2.8-dihydroxy-naphthalene-6-sulfonic acid. The dyestuff thus obtained corresponds probably to the formula:

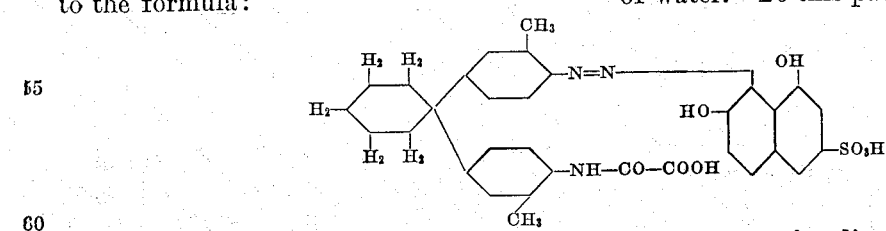

It represents when dry a dark red powder, easily soluble in water, dyeing wool clear bluish red shades of an excellent fastness.

By esterifying this dyestuff by means of para-toluene-sulfo-chloride a new dyestuff is produced dyeing somewhat more clear yellowish shades.

The first named dyestuff may be saponified for instance by boiling it in a caustic soda solution of about 5% strength. The saponification product corresponds to the formula:

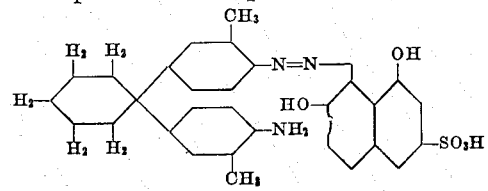

It represents a dark red powder, easily soluble in water, yielding on wool fast bluish red dyeings which are somewhat more bluish than those of the original dyestuff.

Example 4

33.8 parts of 4-amino-diphenyl-cyclohexane-4'-oxamic acid are diazotized as described in Example 1 and the diazo-compound is combined with a solution of soda and 29 parts of 1(2'-chloro-5'-sulfo-phenyl)-3-methyl-5-pyrazolone. The dyestuff is isolated by the addition of common salt. It corresponds to the formula:

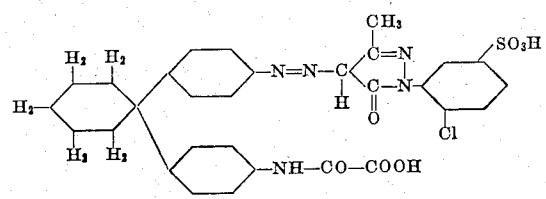

It is easily soluble in water and dyes wool fast clear yellow shades.

The paste of this dyestuff is heated with 400 parts of a caustic soda solution of about 5% strength. The dyestuff thus saponified is precipitated by the addition of common salt, filtered and made to a paste by means of water. To this paste an aqueous solution of 6.9 parts of sodium nitrite and then 46.5 parts of hydrochloric acid of the specific gravity 1.16 are added while stirring at 0–5°. After about one hour's standing the suspension is allowed to run into a solution of soda and 47 parts of the dyestuff 1-amino-2-(4'-nitrophenylazo)-8-hydroxy-naphthalene-3.6-disulfonic acid. After stirring for some hours a green solution is obtained. The dyestuff is isolated by the addition of hydrochloric acid and common salt. It corresponds to the formula:

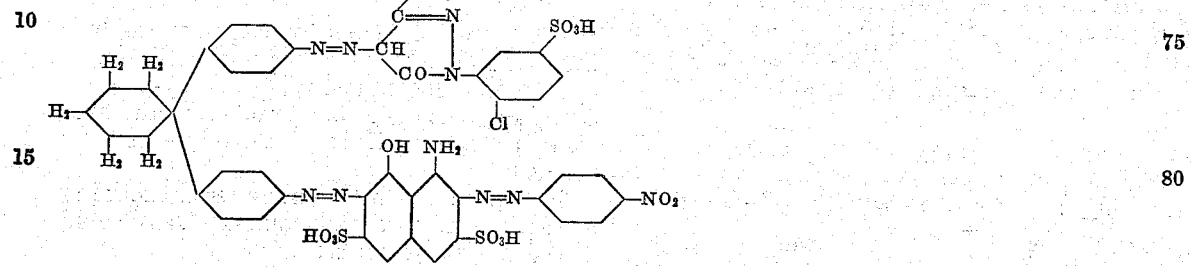

It represents a greygreen powder, easily soluble in warm water, producing clear yellowish green dyeings of a very good fastness.

Example 5

36.6 parts of 4-amino-3.3'-dimethyl-diphenyl-cyclohexane-4'-oxamic acid are diazotized according to Example 1. The diazo-compound is allowed to run slowly into a solution of 22.3 parts of the sodium salt of 1-amino-naphthalene-7-sulfonic acid. The free mineral acid is neutralized by sodium acetate. The dyestuff precipitates partially and is isolated in the customary manner by the addition of soda.

It is made to paste by means of water and mixed with an aqueous solution of 6.9 parts of sodium nitrite and 36.5 parts of hydrochloric acid (specific gravity=1.16) while cooling with ice. The mass is stirred at 0–5° for 1 hour and introduced into a solution of soda and 30 parts of the sodium salt of 1-phenylamino-naphthalene-8-sulfonic acid. After a short time the mass is warmed to about 60° and the dyestuff is isolated in the usual manner. It corresponds to the formula:

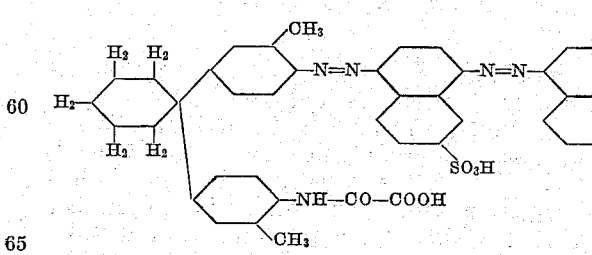

It represents a black powder dyeing wool black shades of an excellent fastness to washing and milling.

When saponified this dyestuff yields a new dyestuff dyeing somewhat more bluish shades. In a similar manner bluish black, grey or brown dyestuffs can be produced according to the components applied.

By using as end-component 2-(4'-aminophenyl-amino)-5-hydroxy-naphthalene-7-sulfonic acid a dyestuff is obtained yielding on cotton violet dyeings which may be diazotized and developed with 2-naphthol turning thereby to blue.

Example 6

The diazo-compound of 36.6 parts of 4-amino-3.3'-dimethyl-diphenyl-cyclohexane-4'-oxamic acid, prepared according to Example 1, is introduced into a solution of soda and 47 parts of 1-amino-2-(4'nitro-phenylazo)-8-hydroxy-naphthalene-3.6-disulfonic acid. When after about 3 hours the combination is complete, the dyestuff is isolated by the addition of common salt. It corresponds to the formula:

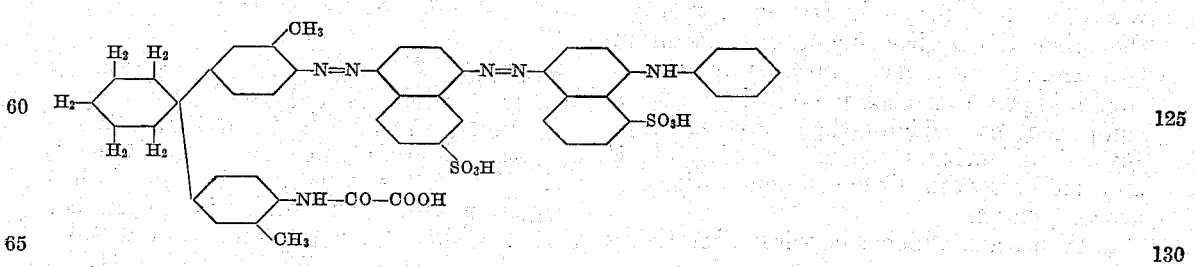

It represents a dark powder, easily soluble in water, dyeing greenish blue-black shades.

Example 7

The diazo-compound of 36.6 parts of 4-amino-3.3'-dimethyl-diphenyl-cyclohexane-4'-oxamic acid, prepared according to Example 1, is introduced at 5-10° into a solution of 14 parts of salicylic acid and 50 parts of a caustic soda lye of 40° Bé. in 300 parts of water. The formed dyestuff is isolated in the customary manner and saponified and rediazotized according to Example 3. The suspension of the diazo-compound thus obtained is allowed to run at 5-10° into a solution of soda and 29 parts of 1-(2'-chloro-5'-sulfo-phenyl)-3-methyl-5-pyrazolone. In this manner a clear yellow dyestuff is produced corresponding to the formula:

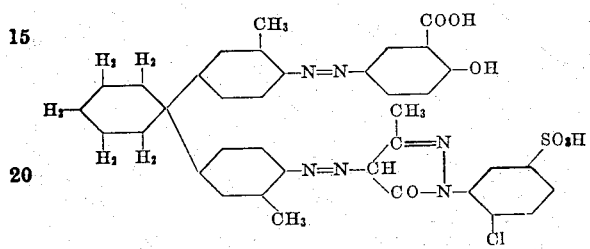

It is easily soluble in water and dyes wool fast yellowish shades scarcely changed by afterchroming but improved thereby as to their fastness.

When the pyrazolone compound is replaced by the equivalent amount of 1-amino-2-(4'-nitro-phenyl-azo)-8-hydroxy-naphthalene-3.6-disulfonic acid, a dyestuff is obtained which dyes the animal fiber greenish blue shades becoming fast bright yellowish green when after-chromed.

By using 2-amino-8-hydroxy-naphthalene-6-sulfonic acid as second component a brown chromable dyestuff of a very good fastness is produced.

Salicylic acid may also be replaced by other components having chromable groups in order to produce other chromable dyestuffs.

We claim:

1. A process which comprises diazotizing a 4-amino-diaryl-cyclohexane-4'-oxamic acid of the general formula:

wherein one X means hydrogen or methyl, the other X's hydrogen and the Y's mean hydrogen, halogen, methyl or alkoxy-groups, combining the diazo-compound with any azo-component, saponifying the azodyestuff thus formed, diazotizing the saponified dyestuff and combining this diazo-compound with any azocomponent.

2. A process which comprises diazotizing a 4-amino-diaryl-cyclohexane-4'-oxamic acid of the general formula:

wherein one X means hydrogen or methyl, the other X's hydrogen and the Y's mean hydrogen, halogen, methyl or alkoxy-groups, combining the diazocompound with any azo-component, saponifying the azodyestuff thus formed.

3. A process which comprises diazotizing a 4-amino-diaryl-cyclohexane-4'-oxamic acid of the general formula:

wherein one X means hydrogen or methyl, the other X's hydrogen and the Y's mean hydrogen, halogen, methyl or alkoxy-groups, combining the diazocompound with any azo-component.

4. As new compounds the azo-dyestuffs of the general formula:

wherein one X means hydrogen or methyl, the other X's hydrogen, the Y's mean hydrogen, halogen, methyl or alkoxy-groups, Z means $-NH_2$ or $-NH-CO-COOH$ and the azo-component may contain further azo-groups, which compounds are colored powders, soluble in water, yielding dyeings of an excellent fastness.

5. As new compounds the azodyestuffs of the general formula:

wherein one X means hydrogen or a methyl-group, the other X's hydrogen, the Y's stand for hydrogen, halogen, methyl or alkoxy-groups, A is hydrogen, OH, $NH_2$, O—acyl, NH—acyl, or N=N—azo-component, B hydrogen or N=N—aryl and $n$ is the number 1 or 2, which compounds are colored powders, soluble in water, yielding dyeings of an excellent fastness.

6. As new compounds the azodyestuffs of the general formula:

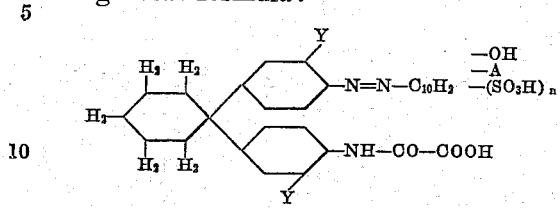

wherein the Y's stand for hydrogen, halogen, methyl or alkoxy-groups, A is OH, $NH_2$, O—acyl, NH—acyl and $n$ means the number 1 or 2, which compounds are colored powders, soluble in water, yielding dyeings of an excellent fastness.

7. As a new compound the azo-dyestuff of the probable formula:

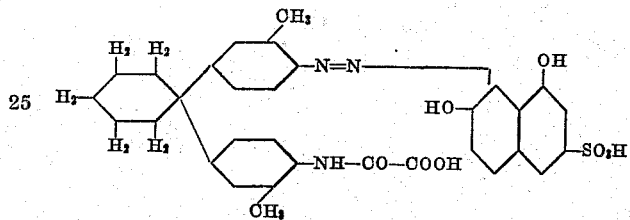

which compound represents when dry a dark red powder, easily soluble in water, dyeing animal fibers clear bluish red shades of an excellent fastness.

In testimony whereof, we affix our signatures.

GEORG KALISCHER.
RICHARD FLEISCHHAUER.